(12) United States Patent
Li et al.

(10) Patent No.: US 10,336,395 B2
(45) Date of Patent: Jul. 2, 2019

(54) FOLDABLE ELECTRIC VEHICLE

(71) Applicant: SHENZHEN CITY BOWMI INTELLECTUAL DRIVING TECHNOLOGY CO., LTD, Boan District, Shenzhen, Guangdong (CN)

(72) Inventors: Jian Li, Guangdong (CN); Zerui Li, Guangdong (CN); Jianming Zhu, Guangdong (CN)

(73) Assignee: SHENZHEN CITY BOWMI INTELLECTUAL DRIVING TECHNOLOGY CO., LTD., Shenzhen (CN)

( * ) Notice: Subject to any disclaimer, the term of this patent is extended or adjusted under 35 U.S.C. 154(b) by 2 days.

(21) Appl. No.: 15/797,044

(22) Filed: Oct. 30, 2017

(65) Prior Publication Data

US 2018/0065703 A1 Mar. 8, 2018

Related U.S. Application Data

(63) Continuation-in-part of application No. PCT/CN2016/080847, filed on Apr. 30, 2016.

(30) Foreign Application Priority Data

Apr. 30, 2015 (CN) .......................... 2015 1 0223282

(51) Int. Cl.
  *B62K 15/00* (2006.01)
  *B62M 6/40* (2010.01)
  (Continued)

(52) U.S. Cl.
  CPC ............. *B62K 15/008* (2013.01); *B62J 9/001* (2013.01); *B62J 11/00* (2013.01); *B62J 25/00* (2013.01);
  (Continued)

(58) Field of Classification Search
  CPC .... B62K 15/00; B62K 15/006; B62K 15/008; B62K 2015/005
  (Continued)

(56) References Cited

U.S. PATENT DOCUMENTS

| 6,883,817 | B2* | 4/2005 | Chu | .................... B62K 15/006 |
|---|---|---|---|---|
| | | | | 280/278 |
| 7,055,842 | B1* | 6/2006 | Lin | ...................... B62K 15/008 |
| | | | | 280/278 |

(Continued)

FOREIGN PATENT DOCUMENTS

| CN | 203819430 U | 9/2014 |
|---|---|---|
| CN | 204223100 U | 3/2015 |

(Continued)

OTHER PUBLICATIONS

English Abstract of CN104875831.
(Continued)

*Primary Examiner* — Tony H Winner

(57) ABSTRACT

The invention discloses a novel rapidly foldable electric vehicle comprising a main beam, a rear wheel, a cross beam, a bracket and a forward/backward movable saddle, wherein a pin is arranged at a junction between a lower end of the bracket and the main beam, a supporting post is arranged at the lower end of the bracket, the bracket and the supporting post are rotatably arranged about the pin, an included angle of less than 180° is formed between the supporting post and the bracket, and a towing wheel is arranged at a lower end of the supporting post. When the vehicle is folded, the saddle slides forward from a rear part of the cross beam and drives the bracket and the supporting post to rotate counterclockwise about the pin, the towing wheel moves downward and backward and gradually touches the ground, and after the towing wheel touches the ground, the rear wheel leaves the ground and the saddle moves to a front part of the cross (Continued)

beam to complete the folding action, thus the vehicle is in a towed or flat state. When the vehicle is towed, the towing wheel is positioned at a middle-rear part of a vehicle body, and when a human body stands upright, the vehicle body tilts, its center of gravity naturally shifts backward, the vehicle body has less pressure on the human body and towing is performed with less effort. When the vehicle is folded, the saddle moves forward without moving backward and the rear space of the vehicle body can be saved. When the vehicle is folded and laid flat, the towing wheel touches the ground and the vehicle body does not tip over easily.

16 Claims, 10 Drawing Sheets

(51) Int. Cl.
| | |
|---|---|
| *B62J 11/00* | (2006.01) |
| *B62J 25/00* | (2006.01) |
| *B62J 99/00* | (2009.01) |
| *B62K 21/02* | (2006.01) |
| *B62K 21/12* | (2006.01) |
| *B62K 21/16* | (2006.01) |
| *B62K 21/26* | (2006.01) |
| *B62M 7/12* | (2006.01) |
| *B62M 9/02* | (2006.01) |
| *B62M 6/60* | (2010.01) |
| *B62J 9/00* | (2006.01) |

(52) U.S. Cl.
CPC ............... *B62J 99/00* (2013.01); *B62K 21/02* (2013.01); *B62K 21/125* (2013.01); *B62K 21/16* (2013.01); *B62K 21/26* (2013.01); *B62M 6/40* (2013.01); *B62M 6/60* (2013.01); *B62M 7/12* (2013.01); *B62M 9/02* (2013.01); *B62J 2099/0006* (2013.01); *B62K 2015/001* (2013.01); *B62K 2015/003* (2013.01); *B62K 2015/005* (2013.01); *B62K 2204/00* (2013.01)

(58) Field of Classification Search
USPC .................................................. 280/278, 287
See application file for complete search history.

(56) References Cited

U.S. PATENT DOCUMENTS

| 9,604,688 | B1* | 3/2017 | Yang | B62J 1/04 |
| 2005/0230933 | A1* | 10/2005 | Woo | B62K 15/008 |
| | | | | 280/278 |
| 2007/0158928 | A1* | 7/2007 | Wu | B62K 15/008 |
| | | | | 280/278 |
| 2015/0068828 | A1* | 3/2015 | Delgatty | B62K 5/06 |
| | | | | 180/210 |
| 2016/0144925 | A1* | 5/2016 | Wang | B62K 21/16 |
| | | | | 280/261 |
| 2016/0210340 | A1* | 7/2016 | Cai | G06F 17/30575 |
| 2016/0297495 | A1* | 10/2016 | He | B62K 15/008 |
| 2017/0190377 | A1* | 7/2017 | Ku | B62D 61/04 |

FOREIGN PATENT DOCUMENTS

| CN | 204567925 U | 8/2015 |
| CN | 204567926 U | 8/2015 |
| CN | 104875831 A | 9/2015 |
| CN | 104875832 A | 9/2015 |
| EP | 2902305 A1 | 8/2015 |

OTHER PUBLICATIONS

English Abstract of CN104875832.
English Abstract of CN204567925.
English Abstract of CN204567926.
English Abstract of CN204223100.
English Abstract of CN203819430.
WIPO International Search Report of WO2016/173560 A2.

\* cited by examiner

US 10,336,395 B2

FOLDABLE ELECTRIC VEHICLE

CROSS REFERENCE APPLICATIONS

This application is a continuation-in-part of International Application PCT/CN2016/080847 filed 30 Apr. 2016, which claims the benefit of Chinese Patent Application No.: 201510223282.6 filed 30 Apr. 2015, the content of which is incorporated herein by reference.

FIELD OF THE INVENTION

The invention relates to the technical field of bicycles, and particularly to a novel rapidly foldable electric vehicle.

BACKGROUND OF THE INVENTION

With the rapid development of society and the constant improvement in people's living standards, electric bicycles have become necessities in the daily life of ordinary people, a large number of electric bicycles in many varieties are currently sold on the market, but the electric bicycles have the disadvantages of large volume, heavy weight, and inconvenience in storage and transport.

In 2013, Stigo Limited launched a conveniently foldable electric bicycle (visit the official website of Stigo: http://stigobike.com), wherein a video captured by using the product was immediately uploaded to Knewsmart and TencentVideo (the video link address in Knewsmart: http://knewsmart.com/news/5346/, the issue date: Sep. 24, 2013; and the video link address in TencentVideo: http://v.qq.com/boke/page/i/z/j/i0118mtpnzj.html, the upload date: Sep. 24, 2013), and another video captured by using the product was also uploaded to Youku on Sep. 27, 2013 (the video link address in Youku: http://v.youku.com/v_show/id_XN-jEOMTYyMjcy.html). The above videos can also be seen by searching other websites in Google.

Stigo Limited submitted a patent application for an invention (application number: 14164491.4; title of the invention: foldable vehicle) to the European Patent Office on Apr. 11, 2014. Stigo Limited filed a Chinese invention patent (application number: 201410204459.3; title of the invention: foldable bicycle) on May 14, 2014 based on the application submitted to the European Patent Office as a priority document. Stigo Limited submitted a design patent (application number: CN201430069387; publication date: Oct. 1, 2014) of the product to the State Intellectual Property Office of the People's Republic of China on Mar. 28, 2014. A technician from Hubei Province submitted a utility model patent entitled "portable foldable electric bicycle" (application number: 201420169248.6; announcement date: Oct. 22, 2014) on Apr. 10, 2014. A company in Hangzhou submitted an invention patent entitled "foldable electric vehicle" (application number: 201410677404.4; publication date: Mar. 25, 2015; a utility model patent was filed for the patent, wherein the application number is 201420706209.5 and the authorization announcement number is CN204223100U) on Nov. 4, 2014.

The foldable electric vehicle disclosed by Stigo Limited has a novel concept and strong practicality, but also has significant defects; and a comprehensive analysis of its patent documents, product videos and real product can demonstrate that the mechanical connection relations and the folding and moving process described in the technical solution of Stigo are as shown at S1 to S4 in FIG. 10 of the specification. The technical disadvantages are described below.

1) Two towing wheels are arranged at a tail end of a vehicle body and far from the center of gravity of the vehicle body, and nearly the entire weight of the vehicle falls on the hands of a person who tows the vehicle based on physics knowledge, thus towing is performed with great effort.

2) Since the towing wheels are arranged at the tail end, it is a rear wheel rather than the towing wheels that actually function to support towing during towing (see the scene in the video of Stigo where a lady who tows the vehicle gets off the subway, showing that the rear wheel rotates when touching the ground). The towing wheels can only be provided with a supporting function by a person who is tall enough or by bending the arms of a user as much as possible to manually lift the rear wheel off the ground, but the action of bending arms for a long time necessarily increases the difficulty for the user, thus towing is performed with great effort (see the scene in the video of Stigo where a lady who tows the vehicle gets on the subway, wherein the lady needs to bend arms to allow the towing wheels to touch the ground).

In fact, Stigo had found the inconvenience brought by this design defect in 2016, and therefore submitted a patent application for an improved scheme of the design (application number: EP16155038; filling date: Feb. 10, 2016) to the European Patent Office in February, 2016, and submitted a Chinese patent application for the scheme (application number: CN2016203101954; publication date: Sep. 21, 2016; refer to the third paragraph (paragraph 0004) of the background section of the application) to the Chinese Patent Office on Apr. 13, 2016. According to the patent documents in which the design has been improved, particularly a detailed analysis of the real product, it is found that Stigo changes the towing wheels fixed at the tail end of the vehicle body as a fine adjustable (telescopic and fine-movable) structure, but the essence and technical effects of the technical solution are not changed, the improved scheme is undesirable and the structure is complex, thus increasing the production cost.

3) After being folded, the vehicle body easily tips over (see the scene at the end of the video of Stigo where the vehicle body tips and rolls over when passing through a security instrument in an airport).

4) When the vehicle body is folded, a saddle moves backward to occupy the rear space of the vehicle body such that the vehicle cannot be provided with a baggage rack (box).

The technical solutions proposed by the following two applicants (application number: 201420169248.6, 201410677404.4 and 201420706209.5) are exactly the same as the technical solution of the product disclosed by Stigo Limited, and therefore do not have substantive technical progress and significant inventiveness.

During the examination of the priority document (a PCT patent) of the present patent application, the examiner has drawn a conclusion that the present PCT patent application is inventive based on the Chinese Utility Model Patent Application No. 201420706209.5 to a company in Hangzhou as a reference document.

SUMMARY OF THE INVENTION

An objective of the invention is to provide a novel rapidly foldable electric vehicle, wherein the center of gravity of a vehicle body is positioned rearward, the vehicle body has less pressure on a human body and towing is performed with less effort when the vehicle is folded and towed, a saddle does not move backward and the rear space of the vehicle body can be saved after the vehicle is folded, and the vehicle body does not tip over easily when the vehicle is folded and laid flat.

To achieve this objective, the invention adopts the following technical solutions.

A novel rapidly foldable electric vehicle comprises a main beam, a rear wheel, a cross beam, a bracket, and a saddle which can move forward and backward and has a position locking device, wherein a pin (also known as a rotating supporting shaft) is arranged at a junction between a lower end of the bracket and the main beam, a supporting post is arranged at the lower end of the bracket, the bracket and the supporting post are rotatably arranged about the pin, an included angle of less than 180° is formed between the supporting post and the bracket, and a towing wheel is arranged at a lower end of the supporting post.

Preferably, the pin is positioned at about ⅓-¼ of the main beam near a rear end thereof.

Preferably, the pin is positioned at about ½-⅙ of the main beam near a rear end thereof.

Preferably, an included angle of 100°-130° is formed between the supporting post and the bracket, or an included angle of 150°-170° is formed between the supporting post and the bracket.

Preferably, the pin is positioned at about ⅓-¼ of the main beam near a rear end thereof, and an included angle of 150°-170° is formed between the supporting post and the bracket.

Preferably, an included angle of 100°, 105°, 110°, 115°, 120°, 125°, 1300, 1350, 1400, 1450, 150°, 155°, 1600, 1650, 170°, 1750 or 180° is formed between the supporting post and the bracket.

Preferably, the towing wheel is arranged at an inner side of the lower end of the supporting post; or a U-shaped opening is arranged at the lower end of the supporting post, and the towing wheel is arranged in the U-shaped opening at the lower end of the supporting post.

Preferably, the main beam is a double-tube main beam, the cross beam is a double-tube cross beam, the bracket is a double-tube bracket and a footrest is arranged at an outer side of the supporting post; and the rear wheel is a rear wheel with a drive motor.

Preferably, the electric vehicle further comprises a front fork, a front wheel and a handlebar straight fork, wherein the front fork is provided with an adaptor joint, a front end of the main beam can rotate leftward, rightward, upward and downward around the adaptor joint, the front wheel is positioned at a lower end of the front fork, and the handlebar straight fork is positioned at an upper end of the front fork.

Preferably, the electric vehicle further comprises a handlebar with a hand brake and a hand gripping portion for towing, wherein two handlebars are provided, the two handlebars are respectively positioned at left and right sides of an upper part of the handlebar straight fork, and the hand gripping portion for towing is arranged at the upper part of the handlebar straight fork; a cell phone holder is arranged at a middle part of the handlebar straight fork; and the front fork is provided with an adaptor joint, and a front end of the main beam can rotate leftward, rightward, upward and downward around the adaptor joint.

Preferably, a sound box is arranged at a front part of the main beam.

Preferably, the saddle can move forward and backward along the cross beam and has a position locking device; a front end of the cross beam is hinged with the front part of the main beam, and an upper part of the bracket is hinged with the saddle; and the supporting post and the bracket are arranged integrally and share the pin.

Preferably, the saddle can move forward and backward along the cross beam and has a position locking device, a front end of the cross beam is hinged with the front part of the main beam, the rear wheel is arranged at a rear end of the main beam, and an upper part of the bracket is hinged with the saddle; and the supporting post and the bracket are arranged in a split manner, share the pin and are connected by a connection mechanism.

Preferably, the distance between the pin and a distal point of the towing wheel is greater than the radius of the rear wheel.

Preferably, when the vehicle is folded, the saddle is unlocked such that the saddle slides forward from a rear part (a rear part or a rear end) of the cross beam and drives the bracket and the supporting post to rotate counterclockwise about the pin, the towing wheel moves downward and backward and gradually touches the ground, and after the towing wheel touches the ground, the saddle continues to slide forward and drives the bracket and the supporting post to continue to rotate about the pin, the rear wheel leaves the ground and the saddle moves to a front part of the cross beam to complete the folding action, thus the vehicle is in a towed or flat state; and when the vehicle is unfolded, the saddle slides backward from the front part of the cross beam and drives the bracket and the supporting post to rotate clockwise about the pin, the rear wheel moves downward and gradually touches the ground, the towing wheel moves forward and upward and gradually leaves the ground, after the rear wheel touches the ground, the saddle continues to drive the bracket and the supporting post to rotate about the pin and the towing wheel leaves the ground by a certain height, and when the saddle moves to the rear part (or the rear end, a lockable position) of the cross beam, the saddle is locked to complete the unfolding action, thus the vehicle is in a riding state.

Preferably, a first sprocket and a drive member for driving the first sprocket to rotate are arranged at a lower part of the supporting post, a second sprocket is arranged at the pin, the axis of the second sprocket coincides with that of the pin, the rear wheel is provided with a third sprocket for driving the rear wheel, the first sprocket is connected with the second sprocket in a driving manner via a first chain, the second sprocket is connected with the third sprocket in a driving manner via a second chain, the second sprocket has a double-track sprocket structure, and the drive member can drive the rear wheel to rotate.

Preferably, the drive member comprises a left pedal, a right pedal, a left connecting bar and a right connecting bar, wherein the left connecting bar is connected to the left pedal and the first sprocket, and the right connecting bar is connected to the right pedal and the first sprocket.

Preferably, the left pedal and the right pedal are foldably arranged; when power-assisted riding, the left pedal is at an angle of 90° to the left connecting bar, the right pedal is at an angle of 90° to the right connecting bar, and the pedals are distributed at two sides of the first sprocket; and when the left pedal and the right pedal are not manually pedaled, the left pedal is at an angle of 0° to the left connecting bar, the right pedal is at an angle of 0° to the right connecting bar, the left pedal abuts the left connecting bar, and the right pedal abuts the right connecting bar.

Preferably, when power-assisted riding, the left connecting bar is at an angle of 180° to the right connecting bar; and in a non-riding state, the left connecting bar and the right connecting bar can be folded to overlap the supporting post.

The left connecting bar and the right connecting bar can be folded to overlap the supporting post, have a locking function, and meanwhile are folded at an upper half part of the first sprocket.

Preferably, the front wheel is a front wheel with a drive motor.

The invention has the following beneficial effects: a novel rapidly foldable electric vehicle comprises a main beam, a rear wheel, a cross beam, a bracket, and a saddle which can move forward and backward and has a position locking device, wherein a pin (also known as a rotating supporting shaft) is arranged at a junction between a lower end of the bracket and the main beam, a supporting post is arranged at the lower end of the bracket, the bracket and the supporting post are rotatably arranged about the pin, an included angle of less than 180° is formed between the supporting post and the bracket, and a towing wheel is arranged at a lower end of the supporting post. Compared with the background art, the invention differs in that the sliding direction of the saddle is opposite to that in the background art (refer to B1 to B4 of FIG. 10 of the specification and S1 to S4 of FIG. 10 of the specification), i.e. when the vehicle is folded, the saddle slides forward from a rear part of the cross beam and drives the bracket and the supporting post to rotate counterclockwise about the pin, the towing wheel moves downward and backward and gradually touches the ground, and after the towing wheel touches the ground, the saddle continues to slide forward and drives the bracket and the supporting post to continue to rotate about the pin, the rear wheel leaves the ground and the saddle moves to a front part of the cross beam to complete the folding action, thus the vehicle is in a towed or flat state.

The beneficial effects of the invention are specifically embodied in that: (1) the invention solves a series of defects caused by towing wheels fixedly arranged at a tail end of a vehicle body in the background art; (2) after the vehicle is folded and towed, the towing wheels serve as supporting points and the supporting points vertically or nearly coincide with the center of gravity of the vehicle body such that the weight of the vehicle body distributed to the arms of a person who tows the vehicle is nearly minimal, thus towing is performed with least effort; (3) in practical use of the product, it is found that, regardless of the height of a user, arms do not need to be bent during towing, and the towing process can be easily completed by naturally putting down the arms; (4) whether the vehicle body is not folded or in a folded and flat state, after the two towing wheels touch the ground, the vehicle body can be kept at the most stable state to avoid an undesirable phenomenon of tipping or rolling over leftward or rightward; and (5) a rear part of the vehicle body has the space necessary for a baggage rack.

The inventiveness of the invention lies in that, compared with the background art, the invention has obtained the technical effects that are unexpected in the background art and more beneficial, just by the mechanical connection relations and the change in the movement direction of the saddle without adding any mechanical component and increasing cost.

The beneficial effects of the invention are further as follows: a manual pedaling device is provided so that the vehicle can be manually driven for riding when its battery is depleted, thus providing more convenience in use.

BRIEF DESCRIPTION OF THE DRAWINGS

The invention is to be further described below in detail with reference to the drawings and embodiments.

In the Figures.

1—main beam; 2—rear wheel; 3—cross beam; 4—bracket; 5—saddle; 6—baggage rack; 7—pin; 8—supporting post; 81—footrest; 9—towing wheel; 100—front fork; 200—front wheel; 300—handlebar straight fork; 400—handlebar; 1001—adaptor joint; 401—hand gripping portion for towing; 402—cell phone holder; 500—sound box; 10—first sprocket; 11—drive member; 111—left pedal; 112—right pedal; 113—left connecting bar; 114—right connecting bar; 12—second sprocket; 13—third sprocket; 14—first chain; 15—second chain.

DETAILED DESCRIPTION OF THE INVENTION

The technical solutions of the invention are to be further described below with reference to FIGS. 1-10 and particular embodiments.

Embodiment 1

Figure 1:
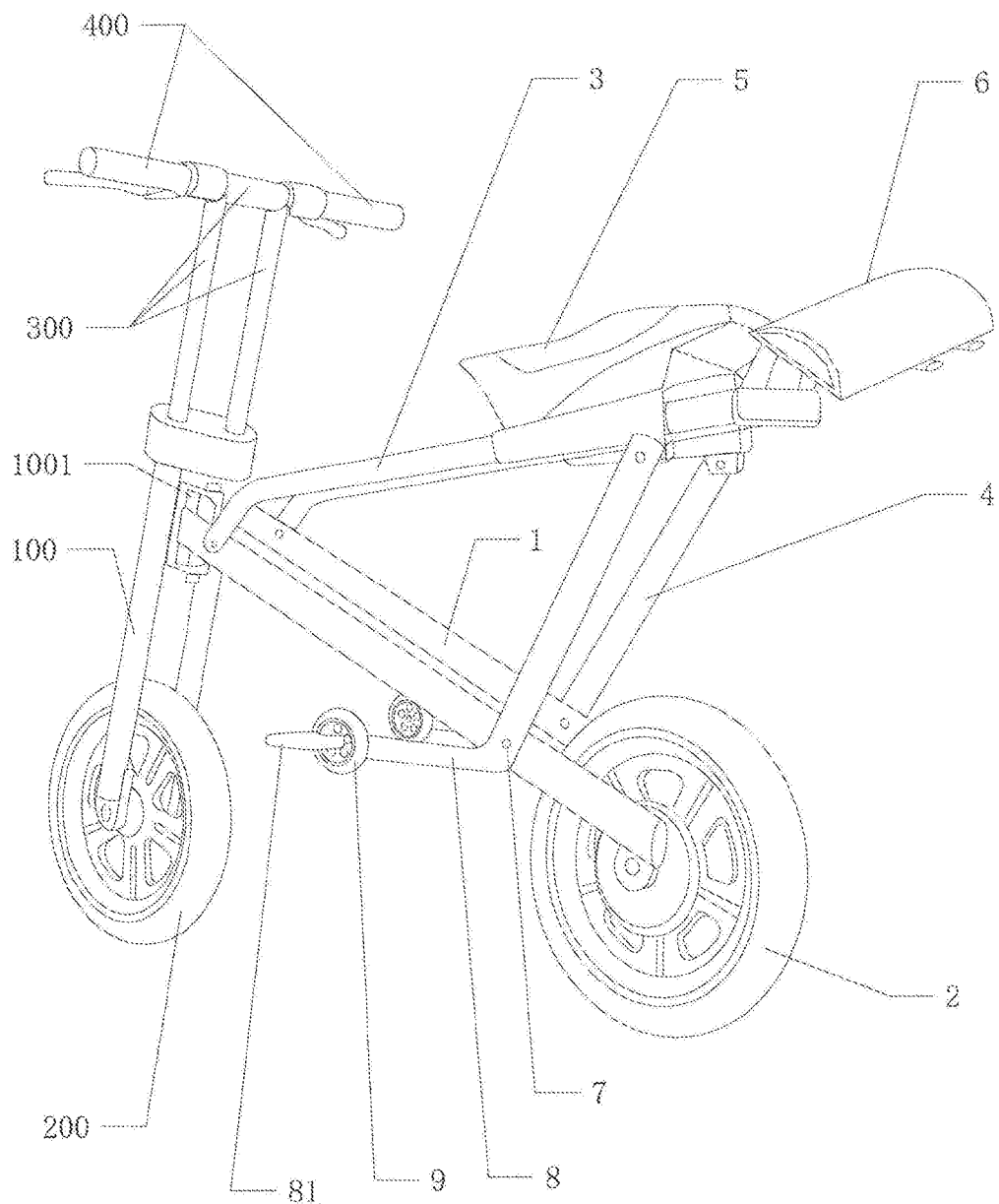
FIG. 1 is a schematic structural view of Embodiment 1 of a novel rapidly foldable electric vehicle according to the invention.

As shown in FIG. 1, a novel rapidly foldable electric vehicle comprises a main beam 1, a rear wheel 2, a cross beam 3, a bracket 4, and a saddle 5 which can move forward and backward and has a position locking device, wherein a pin 7 (used as a rotating supporting shaft) is arranged at a junction between a lower end of the bracket 4 and the main beam 1, a supporting post 8 is arranged at the lower end of the bracket 4, the bracket 4 and the supporting post 8 are rotatably arranged about the pin 7, an included angle of less than 180° is formed between the supporting post 8 and the bracket 4, and a towing wheel 9 is arranged at a lower end of the supporting post 8.

In the embodiment, the pin 7 is positioned at about ⅓-¼ of the main beam near a rear end thereof.

In the embodiment, an included angle of 150°-170° is formed between the supporting post 8 and the bracket 4.

In the embodiment, an included angle of 160° is formed between the supporting post 8 and the bracket 4.

An included angle of 160±10° is formed between the supporting post 8 and the bracket 4 such that the center of gravity of a vehicle body falls between two towing wheels 9 and a front wheel 200, thus the vehicle is stably placed and a force is easily applied to fold the vehicle, but if the angle is too small, the center of gravity is closer to the vertical direction of the towing wheels 9, which may lead to the rising of the rear wheel 2 by itself and poor stability of the vehicle after folding. For example, if the angle is 125°, the vehicle body tends to be in a riding state from a folded state, and therefore is unstable after folding.

The bracket 4 and the supporting post 8 do not necessarily have to be straight and may have a certain radian.

As an alternative, an adaptor may be arranged at a junction between a lower end of the bracket 4 and the main beam 1, and a pin 7 is arranged on the adaptor, thus ensuring that the bracket 4 and the main beam 1 can rotate about the pin 7 without damaging the strength of the bracket 4 and the main beam 1.

In the embodiment, the towing wheel 9 is arranged at an inner side of the lower end of the supporting post 8; or a U-shaped opening is arranged at the lower end of the supporting post 8, and the towing wheel 9 is arranged in the U-shaped opening at the lower end of the supporting post 8.

In the embodiment, the electric vehicle further comprises a rear wheel 2 which is arranged at a rear end of the main beam 1, wherein the main beam 1 is a double-tube main beam 1, the cross beam 3 is a double-tube cross beam 3, the bracket 4 is a double-tube bracket 4, and a footrest 81 is arranged at an outer side of the supporting post 8; and the rear wheel 2 is a rear wheel 2 with a drive motor.

As an alternative, the main beam 1, the cross beam 3, the bracket 4 and the like may be flat-type, single-tubular, multi-tubular, etc.

In the embodiment, the electric vehicle further comprises a front fork 100, a front wheel 200 and a handlebar straight fork 300, wherein the front fork 100 is provided with an adaptor joint 1001, the front fork 100 rotates leftward, rightward, upward and downward around the main beam 1 via the adaptor joint 1001, the front wheel 200 is positioned at a lower end of the front fork 100, and the handlebar straight fork 300 is positioned at an upper end of the front fork 100.

In the embodiment, a baggage rack 6 is arranged at a rear end of the cross beam 3, which can be used to hold baggage and also allows the center of gravity of the vehicle body to shift backward, thus the center of gravity of the folded vehicle body is more conveniently adjusted to the towing wheel 9.

Embodiment 2

Figure 2:
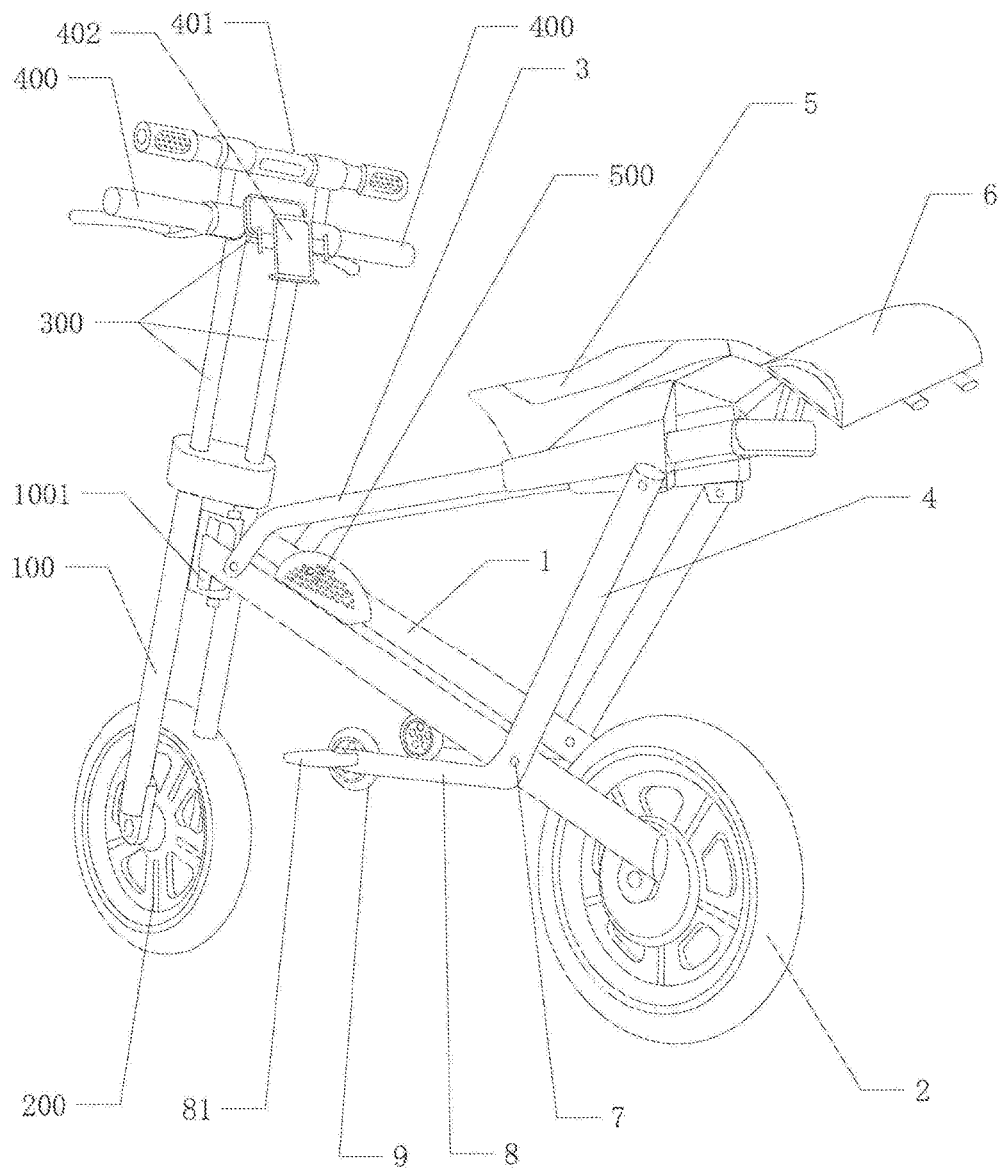
FIG. 2 is a schematic structural view of Embodiment 2 of a novel rapidly foldable electric vehicle according to the invention.

As shown in FIG. 2, in the embodiment, the electric vehicle further comprises a handlebar 400 with a hand brake and a hand gripping portion for towing 401, wherein two handlebars 400 are provided, the two handlebars 400 are respectively positioned at left and right sides of an upper part of the handlebar straight fork 300, and the hand gripping portion for towing 401 is arranged at the upper part of the handlebar straight fork 300; a cell phone holder 402 is arranged at a middle part of the handlebar straight fork 300; and the front fork 100 is provided with an adaptor joint 1001, and the front fork 100 rotates leftward, rightward, upward and downward around the main beam 1 via the adaptor joint 1001.

In the embodiment, the hand gripping portion for towing 401 is rotatably arranged and has a position locking structure, and the height of hands during towing can be adjusted by rotating the angle of the hand gripping portion for towing 401 relative to the handlebar 400, thus facilitating towing by different persons.

In the embodiment, a cell phone holder 402 is arranged at a middle part of the handlebar straight fork 300, which can be used to hold a smart phone.

In the embodiment, a sound box 500 for playing music is arranged at a front part of the main beam 1.

Figure 3:
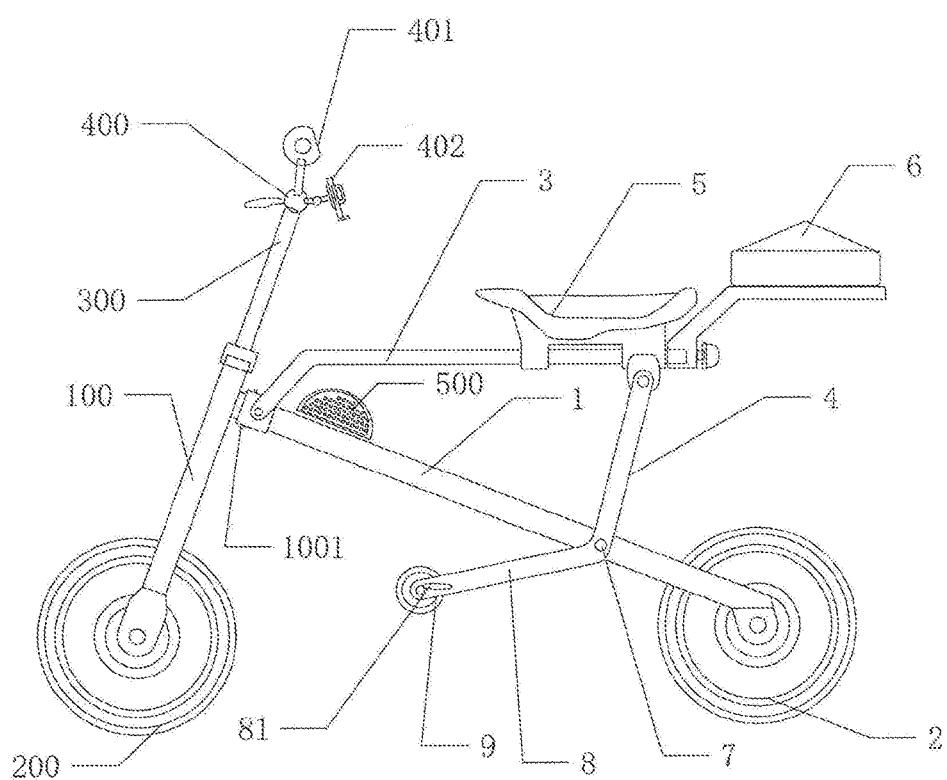
FIG. 3 is a schematic structural view of Embodiment 2 of a novel rapidly foldable electric vehicle in a riding state according to the invention.
Figure 4:
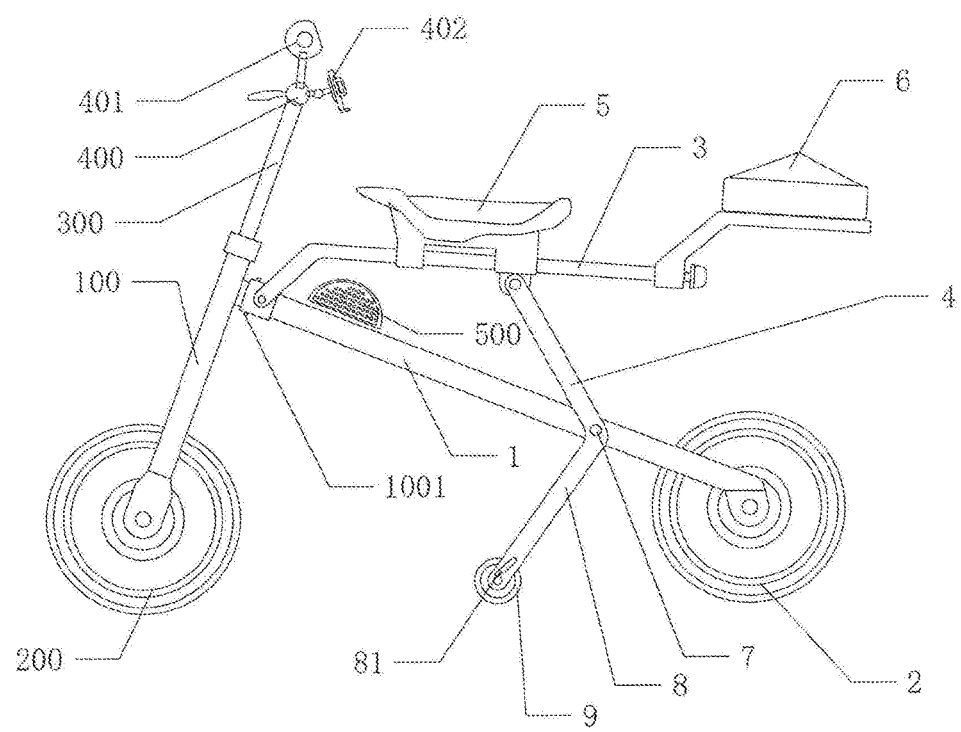
FIG. 4 is a schematic structural view of Embodiment 2 of a novel rapidly foldable electric vehicle according to the invention, wherein a saddle moves forward to a middle section of a cross beam, towing wheels descend to the ground and the two towing wheels are in a ground-supporting state.

As shown in FIGS. 3 and 4, in the embodiment, the saddle 5 can move forward and backward along the cross beam 3 and has a position locking device; a front end of the cross beam 3 is hinged with the front part of the main beam 1, and an upper part of the bracket 4 is hinged with the saddle 5; and the supporting post 8 and the bracket 4 are arranged integrally and share the pin 7. The bracket 4 rotates about the pin 7 while the supporting post 8 also rotates about the pin 7, such that the towing wheel 9 touches the ground during folding to provide a supporting point to the vehicle body.

In the embodiment, the distance between the pin 7 and a distal point of the towing wheel 9 is greater than the radius of the rear wheel 2.

Figure 5:
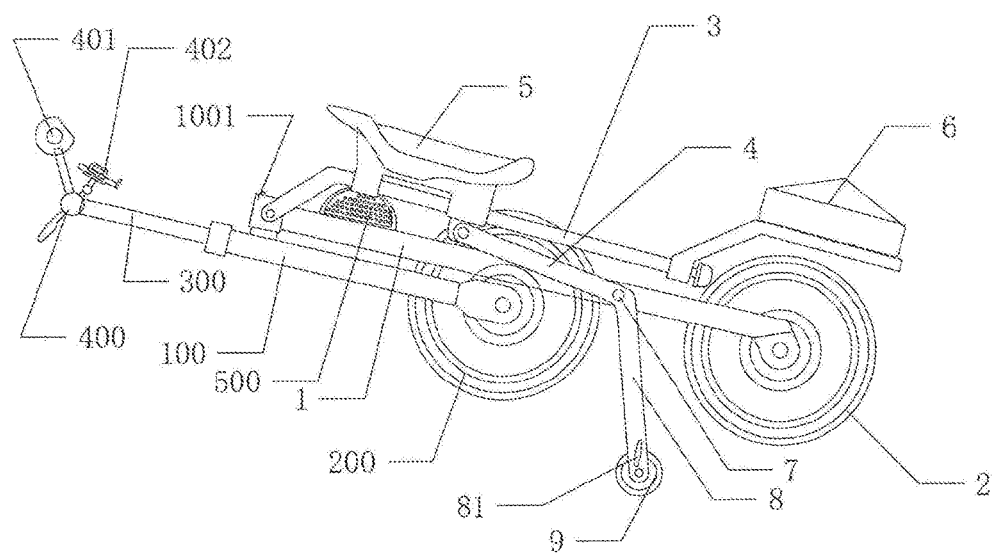
FIG. 5 is a schematic structural view of Embodiment 2 of a novel rapidly foldable electric vehicle according to the invention, wherein a saddle moves forward to a front end of a cross beam, towing wheels continue to descend, a rear wheel is lifted off the ground, then a front fork and a front wheel are folded, and a vehicle body is in a flat or towed state.
Figure 6:
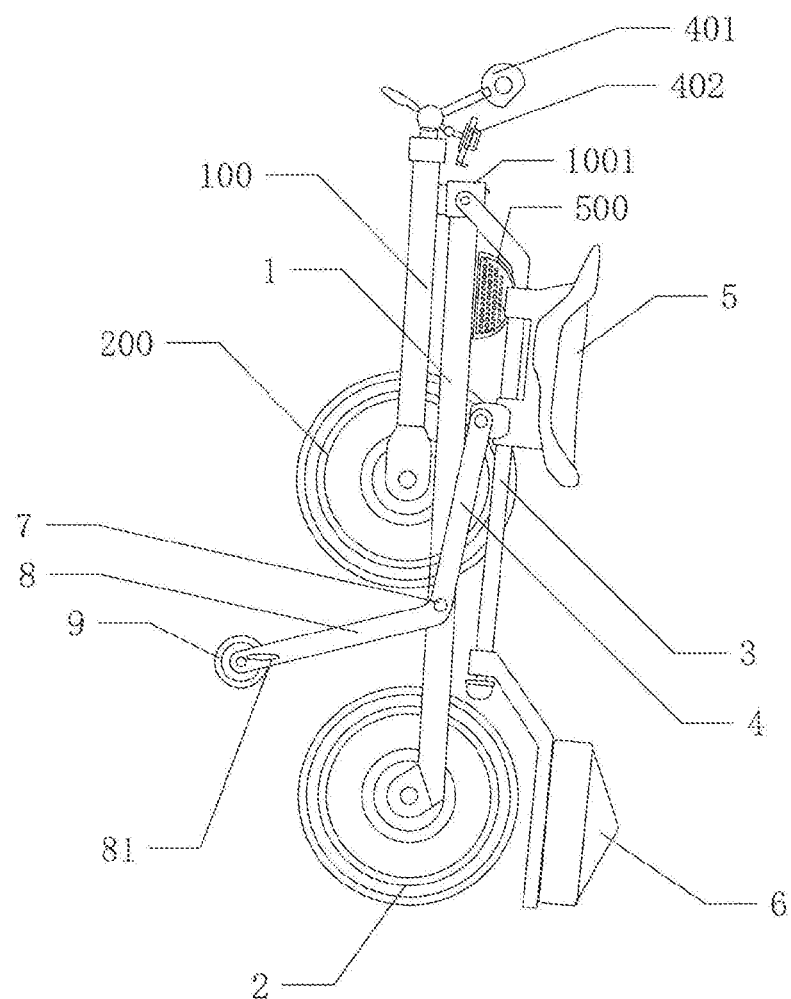
FIG. 6 is a schematic structural view of Embodiment 2 of a novel rapidly foldable electric vehicle according to the invention, wherein a vehicle body is in a folded and upright state, a back edge of a baggage rack and a rear wheel form a supporting surface to prevent the vehicle body from tipping over, and a handlebar straight fork at an upper part of a front fork is retracted to further reduce the occupied space.

As shown in FIGS. 3, 4 and 5, in the embodiment, when the vehicle is folded, the saddle 5 is unlocked such that the saddle 5 slides forward from a rear part (a rear part or a rear end) of the cross beam 3 and drives the bracket 4 and the supporting post 8 to rotate counterclockwise about the pin 7, the towing wheel 9 moves downward and backward and gradually touches the ground, and after the towing wheel 9 touches the ground, the saddle 5 continues to slide forward and drives the bracket 4 and the supporting post 8 to continue to rotate about the pin 7, the rear wheel 2 leaves the ground and the saddle 5 moves to a front part of the cross beam 3 to complete the folding action, thus the vehicle is in a towed or flat state.

As shown in FIG. 5, when the vehicle is towed, the towing wheel 9 is positioned at a middle-rear part of the vehicle body and the center of gravity of the vehicle body is positioned at a middle part of the vehicle body, and when a human body stands upright, the vehicle body tilts, its center of gravity naturally shifts backward and basically falls on the towing wheel 9, the vehicle body has less pressure on the human body and towing is performed with less effort; when the vehicle is folded, the saddle 5 moves forward without moving backward and the rear space of the vehicle body can be saved; and when the vehicle is folded and laid flat, the towing wheel 9 touches the ground to provide a supporting function and the vehicle body does not tip over easily.

When the vehicle is unfolded, the saddle 5 slides backward from the front part of the cross beam 3 and drives the bracket 4 and the supporting post 8 to rotate clockwise about the pin 7, the rear wheel 2 moves downward and gradually touches the ground, the towing wheel 9 moves forward and upward and gradually leaves the ground, after the rear wheel 2 touches the ground, the saddle 5 continues to drive the bracket 4 and the supporting post 8 to rotate about the pin 7 and the towing wheel 9 leaves the ground by a certain height, and when the saddle 5 moves to the rear part (or the rear end) of the cross beam 3, the saddle 5 is locked to complete the unfolding action, thus the vehicle is in a riding state, as shown in FIGS. 5, 4 and 3.

Embodiment 3

In the embodiment, an included angle of 100°-130° is formed between the supporting post 8 and the bracket 4.

In the embodiment, an included angle of 120° is formed between the supporting post 8 and the bracket 4.

Figure 7:
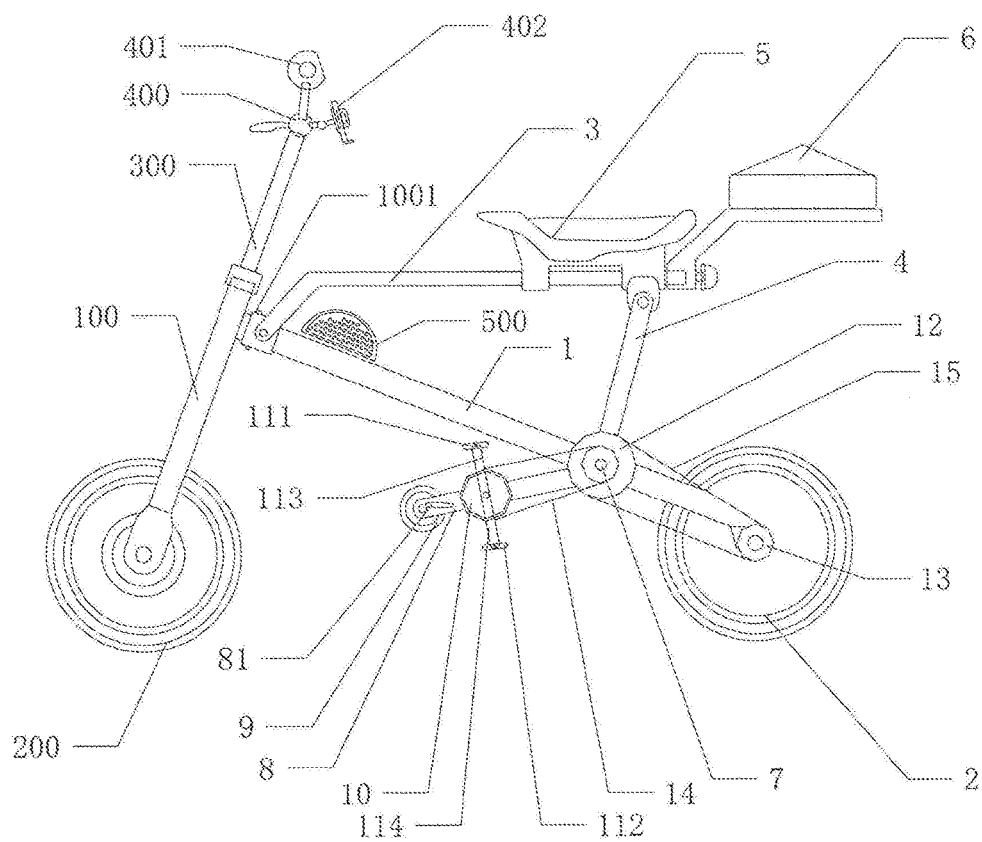
FIG. 7 is a schematic structural view of Embodiment 3 of a novel rapidly foldable electric vehicle with pedals, sprockets and chains and in a pedaled riding state according to the invention.

As shown in FIG. 7, in the embodiment, a first sprocket 10 and a drive member 11 for driving the first sprocket 10 to rotate are arranged at a lower part of the supporting post 8; the drive member 11 comprises a left pedal 111, a right pedal 112, a left connecting bar 113 and a right connecting bar 114; the left connecting bar 113 is connected to the left pedal 111 and the first sprocket 10; and the right connecting bar 114 is connected to the right pedal 112 and the first sprocket 10. A second sprocket 12 is arranged at the pin 7, the axis of the second sprocket 12 coincides with that of the pin 7, the rear wheel 2 is provided with a third sprocket 13, the first sprocket 10 is connected with the second sprocket 12 in a driving manner via a first chain 14, the second sprocket 12 is connected with the third sprocket 13 in a driving manner via a second chain 15, the second sprocket 12 has a double-track sprocket structure, and the first chain 14 and the second chain 15 are respectively placed in the two tracks.

The first sprocket 10, the second sprocket 12 and the third sprocket 13 are arranged such that the foldable electric vehicle can function to assist in riding; and normal folding is not affected due to the reasonable arrangement of the position.

Figure 8:
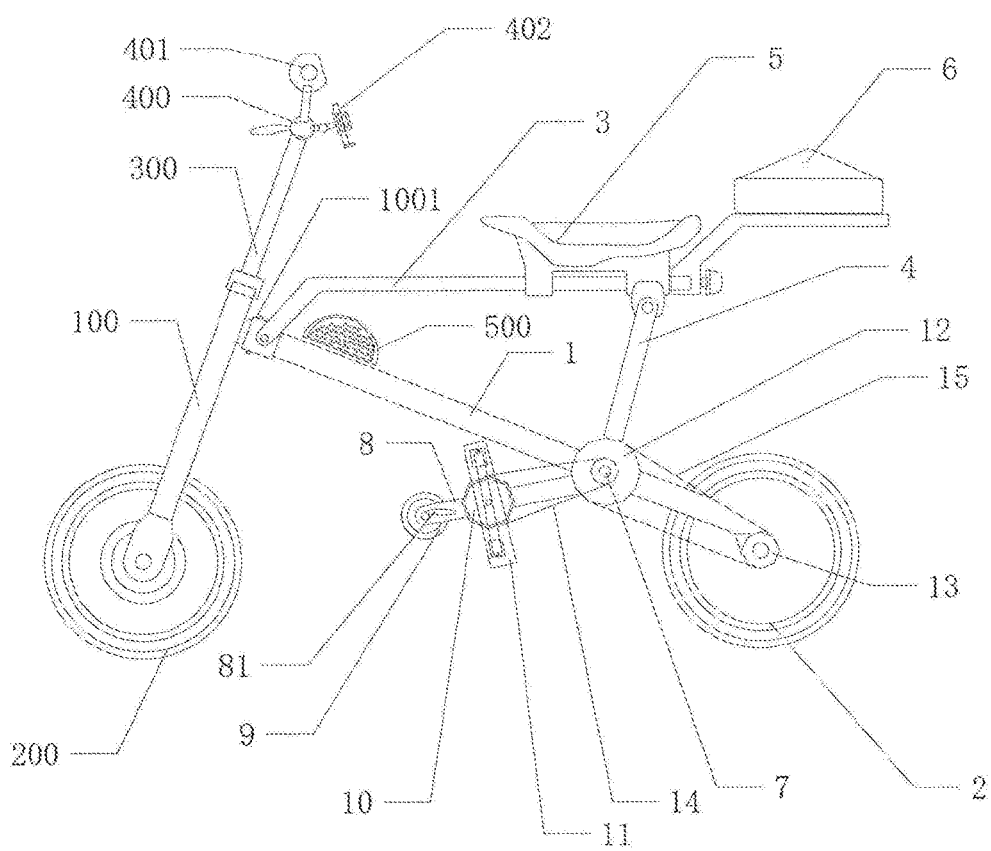
FIG. 8 is a schematic structural view of Embodiment 3 of a novel rapidly foldable electric vehicle with pedals, sprockets and chains according to the invention, wherein the pedals and connecting bars are in a folded state.

In the embodiment, the left pedal 111 and the right pedal 112 are foldably arranged; when pedaled for riding, the left pedal 111 is at an angle of 90° to the left connecting bar 113, the right pedal 112 is at an angle of 90° to the right connecting bar 114, and the pedals are distributed at two sides of the first sprocket 10, as shown in FIG. 7; and when the left pedal 111 and the right pedal 112 are not manually pedaled, the left pedal 111 is at an angle of 0° to the left connecting bar 113, the right pedal 112 is at an angle of 0° to the right connecting bar 114, the left pedal 111 abuts the left connecting bar 113, and the right pedal 112 abuts the right connecting bar 114, as shown in FIG. 8.

Figure 9:
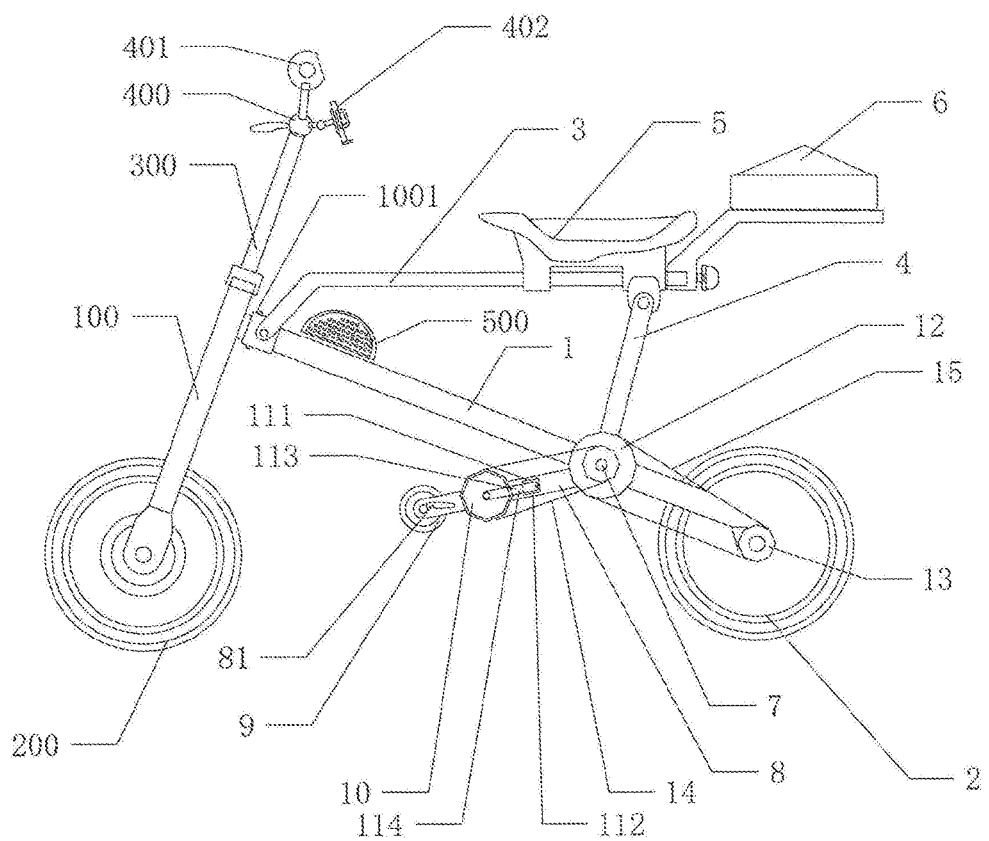
FIG. 9 is a schematic structural view of Embodiment 3 of a novel rapidly foldable electric vehicle with pedals, sprockets and chains according to the invention, wherein connecting bars are folded to overlap a supporting post.

In the embodiment, when the pedals are pedaled for riding, the left connecting bar 113 is at an angle of 180° to the right connecting bar 114, as shown in FIG. 7; and in a non-pedaled riding state, the left connecting bar 113 and the right connecting bar 114 can be folded to overlap the supporting post 8, as shown in FIG. 9.

In the embodiment, a drive motor for driving the front wheel 200 can be arranged at the front wheel 200, thus further simplifying the manufactured product structure.

Figure 10:
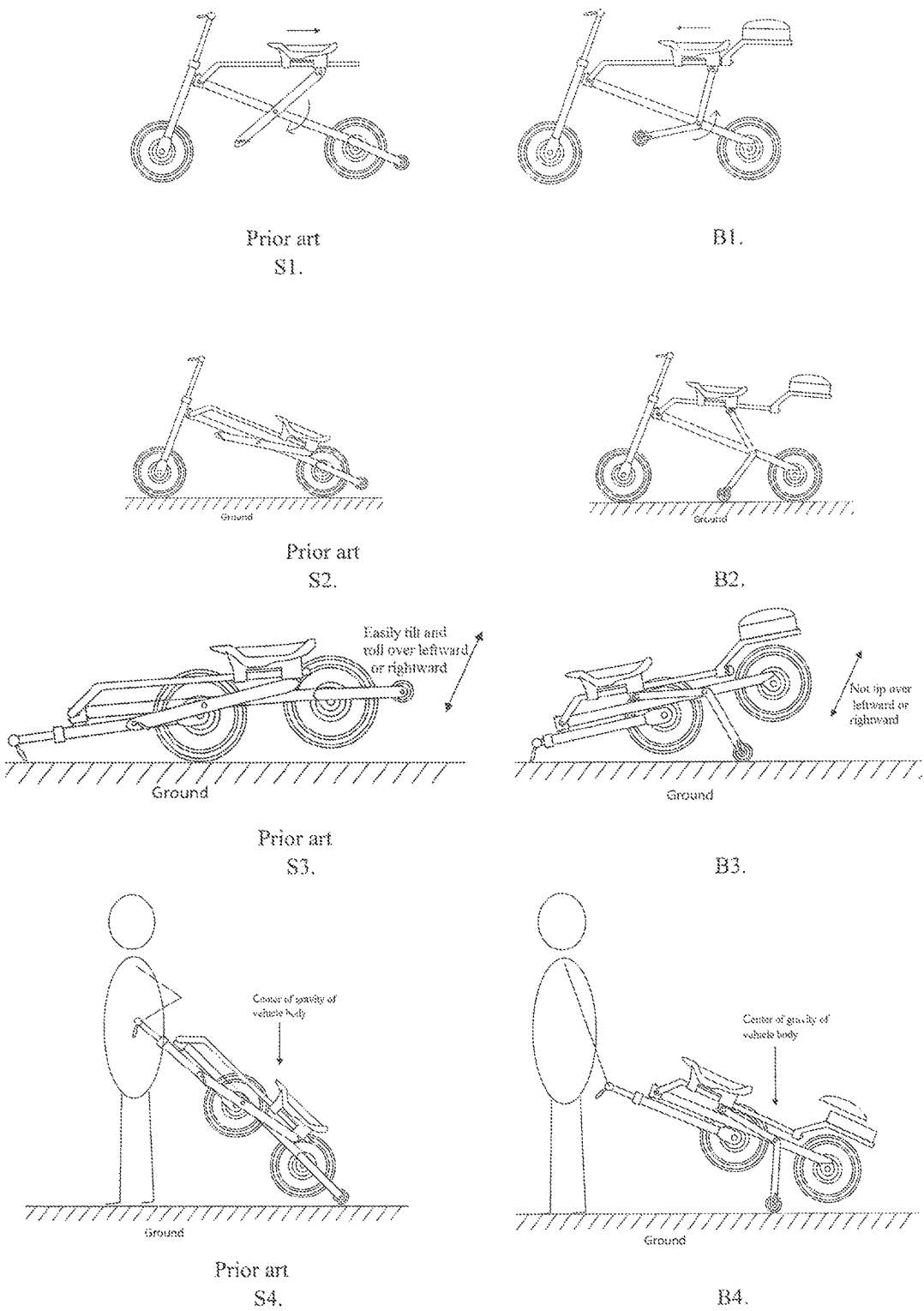
FIG. 10 shows a schematic view of the mechanical structures and the folding and moving process of the background art at S1 to S4, and a schematic view of the mechanical structures and the folding and moving process of a novel rapidly foldable electric vehicle according to the invention at B1 to B4, both of which can serve as a reference to each other.

As shown in FIG. 10 S1. The background art: in a riding state, a saddle is positioned at a rear half part of a cross beam; and when a vehicle is folded, the saddle is pushed backward to a rearmost end of the cross beam to drive a supporting bar to rotate clockwise around an axis.

As shown in FIG. 10 S2. The background art: in a half folded state, the saddle moves to the rearmost end of the cross beam and the supporting bar is approximately parallel to a bearing beam (a main beam), but a vehicle body has no supporting frame and hence easily tips over leftward or rightward.

As shown in FIG. 10 S3. In the background art: when the vehicle is fully folded and laid flat, the vehicle body is only supported by the two supporting points of a front fork and a front wheel (or a rear wheel), thus the vehicle body is unstable, and easily tips and rolls over leftward or rightward.

As shown in FIG. 10 S4. The background art: a person without the desired height needs to bend arms to lift the rear wheel off the ground and allow towing wheels to function, but bending arms for a long time makes the person feel more tired, then the center of gravity of the vehicle body is far from the supporting points (the towing wheels), and a greater force is distributed on the arms, thus towing is performed with great effort.

As shown in FIG. 10 B1. In a riding state, a saddle is positioned at a rearmost end of a cross beam; and when a vehicle is folded, the saddle moves forward to drive a bracket, a supporting post and a towing wheel to rotate counterclockwise around an axis.

As shown in FIG. 10 B2. In a half folded state, the saddle moves to a middle section of the cross beam, left and right towing wheels touch the ground to function as a supporting frame, and a vehicle body does not tip and roll over leftward or rightward.

As shown in FIG. 10 B3. The saddle moves to a frontmost end of the cross beam to complete full folding; and when the vehicle is fully folded and laid flat, a front part of the vehicle body and the left and right towing wheels touch the ground to form three supporting points, thus the vehicle body is stable and does not tip over leftward or rightward.

As shown in FIG. 10 B4. During towing, the rear wheel can leave the ground and the towing wheels can function by naturally putting down arms, and regardless of the height, arms need not be bent, thus towing is performed with least effort. The center of gravity of the vehicle body allows the weight distributed to the arms to be minimal by the supporting points (the towing wheels), thus towing is performed with least effort.

It should be noted that the above particular embodiments only refer to the preferred embodiments of the invention and the technical principles adopted, and all changes or replacements readily contemplated by any one skilled in the art within the technical scope disclosed by the invention shall be covered within the protection scope of the invention.

The invention claimed is:

1. A foldable electric vehicle, comprising a main beam (1), a cross beam (3), a bracket (4), a forward/backward movable saddle (5), and a pin (7) disposed at a junction between a lower end of the bracket (4) and the main beam (1) and connecting the bracket (4) to the main beam (1), a supporting post (8) disposed at the lower end of the bracket (4), the bracket (4) and the supporting post (8) rotating about the pin (7), an angle formed between the supporting post (8) and the bracket (4) that is less than 180°, and a towing wheel (9) disposed at a lower end of the supporting post (8) and connected to the supporting post (8).

2. The foldable electric vehicle according to claim 1, wherein, the pin (7) is positioned at a position about ⅓-¼ length of the main beam (1) from a rear end thereof.

3. The foldable electric vehicle according to claim 1, wherein, the angle formed between the supporting post (8) and the bracket (4) is from 100° to 130°, or the angle formed between the supporting post (8) and the bracket (4) is from 150° to 170°.

4. The foldable electric vehicle according to claim 3, wherein the angle formed between the supporting post (8) and the bracket (4) is 120°, or, the angle formed between the supporting post (8) and the bracket (4) is 160°.

5. The foldable electric vehicle according to claim 3, wherein, the towing wheel (9) is disposed at an inner side of the lower end of the supporting post (8); or, the supporting post (8) has an U-shaped opening and the towing wheel (9) is disposed in the U-shaped opening.

6. The foldable electric vehicle according to claim 5, further comprising a rear wheel (2) disposed at a rear end of the main beam (1) and a footrest (81) disposed at an outer side of the supporting post (8), wherein, the main beam (1) is a double-tube main beam (1), the cross beam (3) is a double-tube cross beam (3), the bracket (4) is a double-tube bracket (4); and the rear wheel (2) has a drive motor.

7. The foldable electric vehicle according to claim 6, further comprising a front fork (100), a front wheel (200) and a handlebar straight fork (300), the front fork (100) having a lower end and an upper end, the front wheel (200) being positioned at the lower end of the front fork (100), and the handlebar straight fork (300) being positioned at the upper end of the front fork (100).

8. The foldable electric vehicle according to claim 7, further comprising two handlebars (400) with a hand brake, a hand gripping portion for towing (401) and a cell phone holder (402), said two handlebars (400) being respectively positioned at left and right sides of an upper part of the handlebar straight fork (300), and the hand gripping portion for towing (401) disposed at the upper part of the handlebar straight fork (300); the cell phone holder (402) disposed at a middle part of the handlebar straight fork (300); and the front fork (100) being provided with an adaptor joint (1001), and the front fork (100) rotating leftward, rightward, upward and downward around the main beam (1) via the adaptor joint (1001).

9. The foldable electric vehicle according to claim 1, wherein, a sound box (500) is arranged at a front part of the main beam (1).

10. The foldable electric vehicle according to claim 1, wherein, the saddle (5) can move forward and backward along the cross beam (3) and has a position locking device; and a front end of the cross beam (3) is hinged with the front end of the main beam (1), and an upper end of the bracket (4) is hinged with the saddle (5).

11. The foldable electric vehicle according to claim 10, further comprising a rear wheel (2) disposed at the rear end of the main beam (1), and the distance between the pin (7) and a distal point of the towing wheel (9) being greater than the radius of the rear wheel (2).

12. The foldable electric vehicle according to claim 10, wherein,
when the vehicle is folded, the saddle (5) is unlocked such that the saddle (5) slides forward from a rear part of the cross beam (3) and drives the bracket (4) and the supporting post (8) to rotate counterclockwise about the pin (7), the towing wheel (9) moves downward and backward and gradually touches the ground, and after the towing wheel (9) touches the ground, the saddle (5) continues to slide forward and drives the bracket (4) and the supporting post (8) to continue to rotate about the pin (7), the rear wheel (2) leaves the ground and the saddle (5) moves to a front part of the cross beam (3) to complete the folding action, and
when the vehicle is unfolded, the saddle (5) slides backward from the front part of the cross beam (3) and drives the bracket (4) and the supporting post (8) to rotate clockwise about the pin (7), the rear wheel (2) moves downward and gradually touches the ground, the towing wheel (9) moves forward and upward and gradually leaves the ground, after the rear wheel (2) touches the ground, the saddle (5) continues to drive the bracket (4) and the supporting post (8) to rotate about the pin (7) and the towing wheel (9) leaves the ground by a certain height, and when the saddle (5) moves to the rear part of the cross beam (3), the saddle (5) is locked to complete the unfolding action.

13. The foldable electric vehicle according to claim 1, further comprising a rear wheel (2) disposed at the rear end of the main beam (1), a first sprocket (10) and a drive member (11) for driving the first sprocket (10) to rotate disposed at a lower part of the supporting post (8), a second sprocket (12) being arranged at the pin (7), and the axis of the second sprocket (12) coinciding with that of the pin (7); and the rear wheel (2) being provided with a third sprocket (13), the first sprocket (10) being connected with the second sprocket (12) via a first chain (14) to drive the second sprocket (12) to rotate, the second sprocket (12) connected with the third sprocket (13) via a second chain (15) to drive the third sprocket (13) to rotate, and the second sprocket (12) having a double-track sprocket structure.

14. The foldable electric vehicle according to claim 13, wherein, the drive member (11) comprises a left pedal (111), a right pedal (112), a left connecting bar (113) and a right connecting bar (114), wherein, the left connecting bar (113) is connected to the left pedal (111) and the first sprocket (10), and the right connecting bar (114) is connected to the right pedal (112) and the first sprocket (10).

15. The foldable electric vehicle according to claim 14, wherein, the left pedal (111) and the right pedal (112) are foldable; when power-assisted riding, an angle formed between the left pedal (111) and the left connecting bar (113) is 90°, an angle is formed between the right pedal (112) and the right connecting bar (114) is 90°, and the pedals are distributed at two sides of the first sprocket (10); and when the left pedal (111) and the right pedal (112) are not manually pedaled, an angle is formed between the left pedal (111) and the left connecting bar (113) is 0°, an angle is formed between the right pedal (112) and the right connecting bar (114) is 0°, the left pedal (111) abuts the left connecting bar (113), and the right pedal (112) abuts the right connecting bar (114).

16. The foldable electric vehicle according to claim 15, wherein, when power-assisted riding, an angle formed between the left connecting bar (113) and the right connecting bar (114) is 180°; and in a non-riding state, the left connecting bar (113) and the right connecting bar (114) can be folded to overlap the supporting post (8).

* * * * *